UNITED STATES PATENT OFFICE.

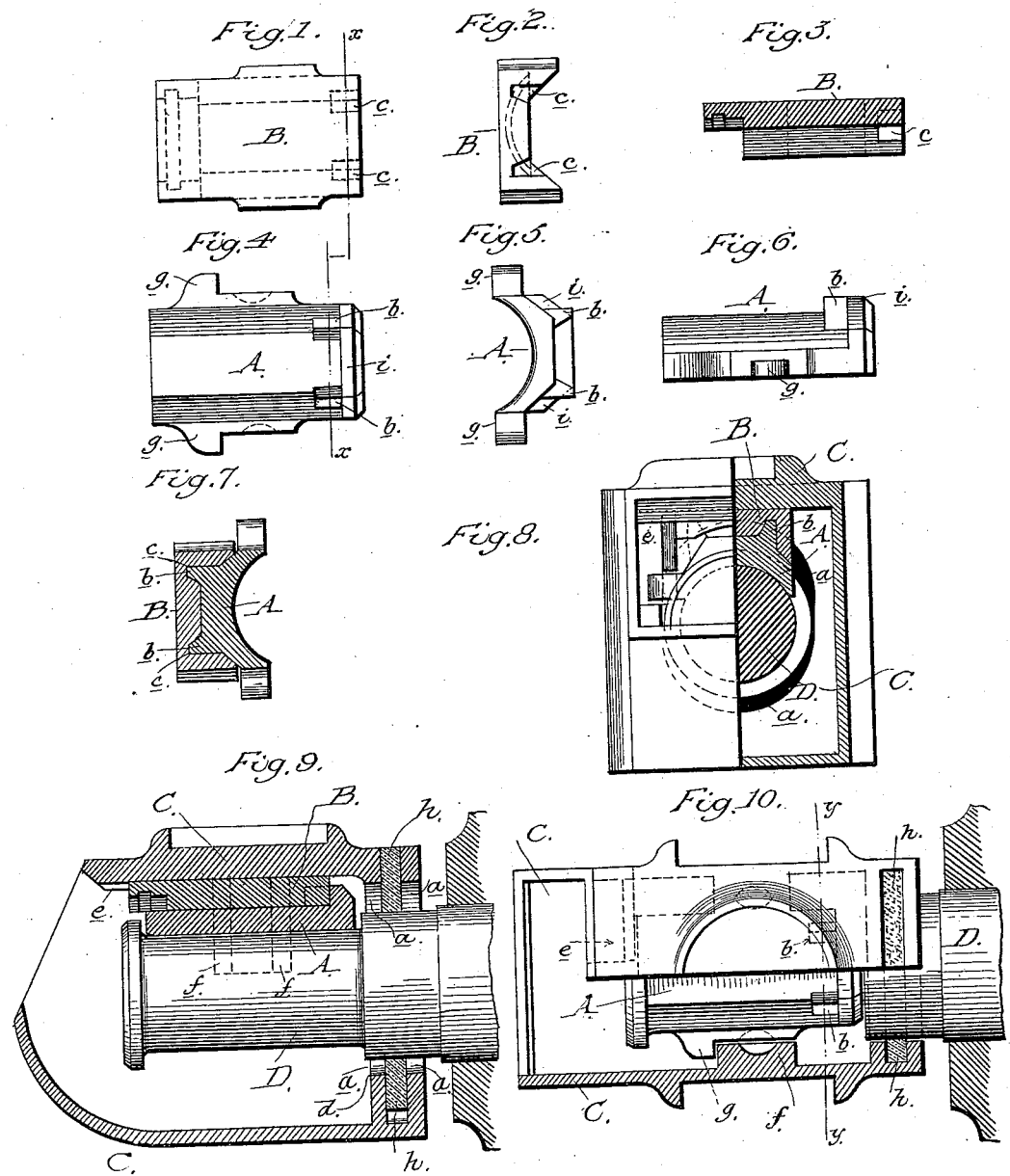

HERMAN A. TODD AND ALFRED H. ANDERSON, OF SHELTON, WASHINGTON.

JOURNAL-BEARING.

SPECIFICATION forming part of Letters Patent No. 472,150, dated April 5, 1892.

Application filed August 8, 1891. Serial No. 402,128. (No model.)

*To all whom it may concern:*

Be it known that we, HERMAN A. TODD and ALFRED H. ANDERSON, citizens of the United States, and residents of Shelton, in the county of Mason and State of Washington, have invented certain new and useful Improvements in Journal-Bearings, as set forth in the accompanying drawings, forming part of this specification, in which—

Figure 1 represents a plan view of the journal-bearing key. Fig. 2 is an end view of the same. Fig. 3 is a section view of same. Fig. 4 is a plan view of the journal-bearing. Fig. 5 is an end view of Fig. 4. Fig. 6 is a side view of Fig. 4. Fig. 7 is a transverse sectional view on the line $x\ x$ of Figs. 1 and 4. Fig. 8 is a transverse sectional view of journal-bearing A, key B, journal-box C, and axle D on line $y\ y$ of Fig. 10. Fig. 9 is a sectional view through center line of axle D of journal-bearing A, key B, and journal-box C. Fig. 10 is a half-plan and half-sectional view of the same on center line of axle D.

Our invention relates to the improvement of journal-bearings especially adapted for the trucks of logging-cars; and it consists of the construction and combination of devices which we shall hereinafter fully describe and claim.

To enable others skilled in the art to which our invention appertains to make and use the same, we will now describe its construction and indicate the manner in which the same is carried out.

In loading and unloading logging-cars some of the logs, when rolled on or off the car, overbalance the weight of the car-body, causing it to tip slightly, raising the journal-box off the journal, and in many instances the wedge or key will stick in the top of the journal-box, thereby permitting the journal-bearing to slip laterally out of place, and thus causing damaged or ruined boxes or journals. In our invention we employ a combined journal-bearing and journal-bearing key, which effectively prevents the liability of the journal-bearing being misplaced in any manner.

In journal-boxes as commonly made the hole or recess through which the axle passes is made oblong in the back of the box to enable the box to be raised for the purpose of putting in and removing the journal-bearings and key when necessary and to allow for wear, as little space being allowed between the axle and the bottom of the oblong hole, before mentioned, as will permit of the box being raised sufficiently to remove or insert the journal-bearing and key from the outside and over the collar of the journal. When the journal-bearing is partly worn out, it gives more space in case the key should be stuck in the box between the journal and the key when the box is raised and allows the journal-bearings better chances to slip out of place.

Our invention does away with any possibility of the journal-bearings being misplaced in any way and requires no more space between the journals and top of the inside of the box to admit the journal-bearing and its key than the constructions now in use.

Referring now to the accompanying drawings for a more detailed description of our invention, A represents what is designated as a "journal-bearing," provided at one end, on the upper side, with a cross-bar or key-stop $i$, Figs. 4, 5, and 6. Contiguous to the cross-bar are two lugs $b$, which are integral with the journal-bearing and extend to the top of the cross-bar, the said lugs having straight vertical outer walls, as shown in Fig. 5. The exact shape of the inclined or inner walls is immaterial, and they are made light, so as to use as little brass or composition in their construction as is necessary. The top of the journal-bearing A is adapted to be fitted to the journal-bearing key B, having openings $c$ in one end to receive the lugs $b$ of the journal-bearing A. The top of the inside of the journal-box C is flat, as is also the top of the key B, on which the journal-box rests.

On the sides of the inside of the journal-box C are cast lugs $f\ f$, which are for the purpose of holding the journal-bearing and axle centrally in the box, and also to serve as a stop for the side lugs $g$ of the journal-bearing, which prevents longitudinal play of the journal-box one way of the journal. There is also another lug or stop $e$ cast on the inside top of the journal-box, which the key B bears against, which prevents the longitudinal play the other way.

The journal-box C has an oblong hole $a$ in the back end, through which the axle passes and revolves, as shown in Figs. 8 and 9. The space between the top of the axle D and box C at $a$ is greater than at the bottom to allow for wear of journal-bearing. The space at the bottom at $d$, Fig. 9, is a trifle more than the depth of the stop $e$, so that by raising the journal-box C until it comes in contact with the under surface of the axle D there will be space enough to remove or insert longitudinally the key B under the stop $e$. When the key is removed, there is ample room to remove or insert the journal-bearing.

In Figs. 9 and 10, $h\ h$ represent the dust-guard, which is for the purpose the name implies, and also to retain the oil and waste packing.

In order to prevent the journal-bearing being displaced when the car is careened or box raised, we find it desirable to make the lugs $b$ of a height sufficient to make the distance between the base and top of their exterior walls about double the distance or more than there is space between the bottom of the axle and bottom of the oblong hole in the back of the box. Such an arrangement will permit the journal-bearing key B to be raised the height of the lugs before the journal-bearing can be displaced laterally.

Having thus described our invention, what we claim as new, and desire to secure by Letters Patent, is—

1. The combination, with a journal-box having the lugs $f$, of the journal-bearing A, having side lugs for engaging said lugs $f$ and having projecting from its upper side the cross-bar $i$ and separated lugs $b$, having straight vertical outer walls, and a bearing-key B, seated upon said bearing, with its upper flat surface in contact with the inner top wall of the box, said bearing-key having the openings $c$, adapted to receive the said lugs of the journal-bearing A, substantially as herein described.

2. The journal-bearing A, having spaced lugs rising from its upper surface and provided with straight vertical outer walls, in combination with the longitudinally and vertically movable journal-bearing key having openings with straight vertical outer walls adapted to receive said lugs and prevent displacement of the bearing, substantially as herein described.

HERMAN A. TODD.
ALFRED H. ANDERSON.

Witnesses:
GEORGE LAWLER,
M. F. WARD.